United States Patent [19]

Kawazu et al.

[11] 3,977,761

[45] Aug. 31, 1976

[54] BAR LENS ARRAY CLEANING DEVICE

[75] Inventors: Motoaki Kawazu; Masataka Ide; Atsushi Kawamura, all of Tokyo, Japan

[73] Assignee: Ricoh Co., Ltd., Tokyo, Japan

[22] Filed: May 27, 1975

[21] Appl. No.: 581,237

[30] Foreign Application Priority Data

May 28, 1974 Japan.......................... 49-60381[U]

[52] U.S. Cl................................. 350/61; 350/96 B; 350/96 GN; 350/175 GN
[51] Int. Cl.²...................... G02B 11/04; G02B 5/14
[58] Field of Search................. 350/61, 321, 96 BC, 350/96 B, 96 R, 96 GN, 175 GN

[56] References Cited
UNITED STATES PATENTS 3,402,418  9/1968  Leroy.................................... 350/61

Primary Examiner—John K. Corbin
Assistant Examiner—Jon W. Henry
Attorney, Agent, or Firm—Frank J. Jordan

[57] ABSTRACT

A plastic casing in which bar lenses are imbedded is formed with longitudinal grooves in the sides thereof. The bifurcations of a bifurcated pull rod are guidingly slidable in the grooves. A frame is connected to the pull rod for movement therewith and has portions facing the end faces of the bar lenses to which is fixed a cleaning material such as cloth. Movement of the pull rod, frame and cleaning material results in the cleaning material moving over the faces of the bar lenses to clean the same.

7 Claims, 3 Drawing Figures

BAR LENS ARRAY CLEANING DEVICE

The present invention relates to a bar lens cleaning device.

A bar lens or similar optical fibre array consists of one or more rows of elongated light transmitting members embedded in a plastic retaining member. These arrays are advantageously utilized in laser, micro-optical photoconductive diode and multiple image lens applications. In a typical application involving a copying machine, a bar lens array is disposed between an original document to be copied and a photoconductive member such as a rotary drum. In such an application, the spacing between the ends of the bar lenses and either of the document or drum is on the order of 20mm, and an operator cannot insert a cloth wrapped around a finger or other convenient instrument to clean the end surfaces of the bar lenses.

It is therefore an object of the present invention to provide a cleaning device for a bar lens array or similar light transmission device which comprises a frame carrying a cleaning material facing the ends of the bar lenses in a retaining member and a bifurcated pull rod connected to the frame to move the same which is guidably slidable in longitudinal grooves formed in the retaining member.

The above and other objects, features and advantages of the present invention will become apparent from the following detailed description taken with the accompanying drawings, in which.

Figure 1:
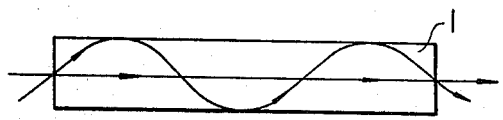
FIG. 1 is a diagram illustrating the optical function of a bar lens.

Referring now to FIG. 1, a bar lens 1 is shown symbolically in longitudinal section. In such a lens 1, the index of refraction varies parabolically from the axis of the lens 1 radially outward so that a light ray designated by an arrow in FIG. 1 is refracted in such a manner as to pass through the lens 1 in a zig-zag manner relative to the axis. Similar to a convex converging lens, the bar lens 1 will form an image of an object at a particular distace from the lens 1 preferably at a magnification of unity, and is extremely useful for focussed light piping or transmission applications.

Figure 2:
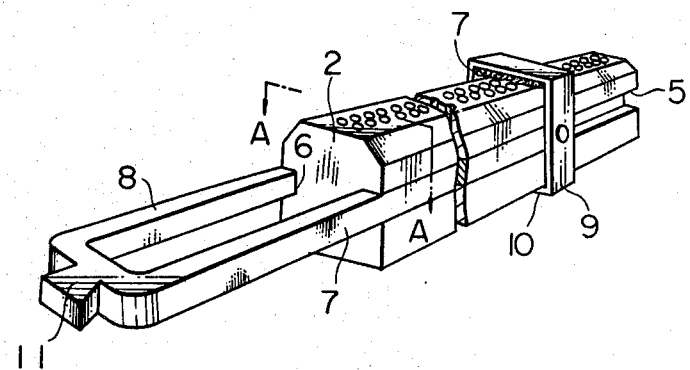
FIG. 2 is a perspective view of a bar lens array and a cleaning device of the present invention.
Figure 3:
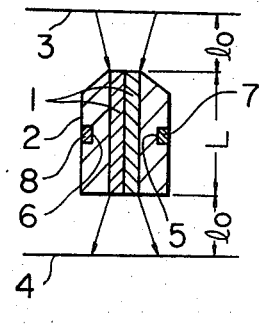
FIG. 3 is a section on a line A—A of the bar lens array shown in FIG. 2.

Referring now to FIGS. 2 and 3, a plurality of the lenses 1 of length L are embedded in a plastic retaining member 2 in elongated parallel rows. As designated by arrows in FIG. 3, the lenses 1 will form images of an object plane 3 at a distance lo from the upper faces of the lenses 1 on an image plane 4 which is at the same distance lo from the bottom faces of the lenses 1. The sides of the retaining member 2 are formed with opposed longitudinal grooves 5 and 6 which are parallel to the row direction of the lenses 1.

A rectangular frame 9 has upper and lower portions (no numerals) to which are fixed a cleaning material 10 such as a brush, cloth, fur or the like. The cleaning material 10 is slightly compressed to contact the upper and lower faces of the bar lenses 1. A bifurcated handle or pull rod 11 has bifurcations 7 and 8 which slidingly and guidingly engage in the grooves 5 and 6 in the sides of the retaining member 2. The ends of the bifurcations 7 and 8 are connected to the frame 9.

To operate the cleaing device, the pull rod 11 is manually or automatically moved in the longitudinal or row direction so that the frame 9 and cleaning material 10 are also moved so that the cleaning material 10 physically contacts the faces of the bar lenses 1 and is swept over all of the bar lenses 1 to clean the same.

Various modifications are possible within the scope of the invention. For example, the retaining member 2 may be movable and the cleaning material 10 fixed. The pull rod may be provided with only one elongated portion rather than two bifurcations to slide in a single longitudinal groove formed in the retaining member. Other modifications will be obvious to those skilled in the art after receiving the teaching of the present disclosure.

What is claimed is:

1. In a light transmission device having a plurality of elongated light transmitting members joined together in a row, the combination therewith of:

a cleaning material; and means for guidably producing relative movement between the cleaning material and the light transmitting members in the row direction so that the cleaning material contacts the end faces of the light transmitting members to clean the end faces of the light transmitting members.

2. The device of claim 1, in which the light transmitting members are bar lenses.

3. The device of claim 1, in which the light transmitting members are fixed and the means comprises a movable frame member having portions facing the end faces of the light transmitting members, the cleaning material being provided on said portions.

4. The device of claim 3, in which the means further comprises a handle member connected to the frame member.

5. The device of claim 4, further comprising a retaining member for rigidly retaining the light transmitting members, the retaining member being formed with a groove in the row direction, the handle member being slidable in the groove and guided thereby for movement in the row direction.

6. The device of claim 1, further comprising a retaining member for rigidly retaining the light transmitting members, the retaining member being formed with a pair of opposed grooves extending in the row direction, the means comprising a bifurcated member, the bifurcations of which are slidably and guidingly engageable in the grooves in the retaining member and a frame member connected to the bifurcated member and having portions facing the end faces of the light transmitting members, the cleaning material being provided on said portions to physically engage with and clean the faces of the light transmitting members upon relative movement of the frame member and the retaining member.

7. The device of claim 6, in which the retaining member and thereby the light transmitting members are fixed and the bifurcated member and thereby the frame member and cleaning material are movable.

* * * * *